(12) United States Patent
Hayden

(10) Patent No.: US 6,927,695 B2
(45) Date of Patent: Aug. 9, 2005

(54) SENSOR LOOP WITH DISTRIBUTED POWER SOURCES AND METHOD THEREFOR

(75) Inventor: Herbert T. Hayden, Tempe, AZ (US)

(73) Assignee: Pinnacle West Capital Corporation, Phoenix, AZ (US)

( * ) Notice: Subject to any disclaimer, the term of this patent is extended or adjusted under 35 U.S.C. 154(b) by 325 days.

(21) Appl. No.: 10/075,479

(22) Filed: Feb. 12, 2002

(65) Prior Publication Data

US 2003/0151505 A1 Aug. 14, 2003

(51) Int. Cl.$^7$ .............................................. G08B 21/00
(52) U.S. Cl. ...................... 340/657; 340/506; 340/507; 340/508; 340/517; 340/540; 340/601; 340/602
(58) Field of Search ................................. 340/657, 517, 340/521, 540, 506, 507, 508, 601, 602, 511, 539.28, 533, 531; 701/1, 3, 14; 73/170.01, 170.16, 170.27; 702/1, 3

(56) References Cited

U.S. PATENT DOCUMENTS

| | | | |
|---|---|---|---|
| 4,137,467 A | 1/1979 | Plog | 307/264 |
| 4,290,055 A | 9/1981 | Furney et al. | 340/518 |
| 4,361,832 A | 11/1982 | Cole | 340/505 |
| 4,361,833 A | 11/1982 | Allgood | 340/533 |
| 4,459,582 A | 7/1984 | Sheahan et al. | 340/539 |
| 4,474,169 A * | 10/1984 | Steutermann | 126/592 |
| 4,622,538 A | 11/1986 | Whynacht et al. | 340/506 |
| 5,347,515 A | 9/1994 | Marino | 370/85.2 |
| 5,355,208 A | 10/1994 | Crawford et al. | 356/35.5 |
| 5,381,136 A * | 1/1995 | Powers et al. | 340/539.26 |
| 5,400,009 A | 3/1995 | Kosich et al. | 340/331 |
| 5,471,194 A | 11/1995 | Guscott | 340/511 |
| 5,493,273 A * | 2/1996 | Smurlo et al. | 340/541 |
| 5,650,800 A | 7/1997 | Benson | 345/173 |
| 5,706,455 A | 1/1998 | Benton et al. | 395/348 |
| 5,796,606 A | 8/1998 | Spring | 364/138 |
| 5,864,286 A | 1/1999 | Right et al. | 340/501 |
| 5,910,765 A | 6/1999 | Slemon et al. | 340/517 |
| 6,014,612 A | 1/2000 | Larson et al. | 702/183 |
| 6,088,665 A | 7/2000 | Burns et al. | 702/188 |
| 6,285,966 B1 | 9/2001 | Brown et al. | 702/188 |
| 6,311,107 B1 * | 10/2001 | Curto et al. | 701/14 |

* cited by examiner

Primary Examiner—Hung Nguyen
(74) Attorney, Agent, or Firm—Lowell W. Gresham; Jordan M. Meschkow; Meschkow & Gresham, P.L.C.

(57) ABSTRACT

A fail-safe electrical control system in the form of a sensor loop (24) is provided. The sensor loop (24) includes any number of sensor units (22) coupled in series. Each sensor unit (22) includes a local power source (26), a local sensor (14), and a local indicator controller (30). The local power source (26), local sensor (14), and local indicator controller (30) are coupled in series within the sensor unit (22) and the sensor loop (24) to form a closed circuit (40) that does not require a central controller or the performance of loop configuration activities. The local power sources (26) distributed throughout the sensor loop (24) within the sensor units (22) are all isolated from the earth. In one preferred embodiment, the sensor loop (24) controls the movement of solar collectors (12) into wind stow positions when high wind (16) conditions occur.

21 Claims, 2 Drawing Sheets

SENSOR LOOP WITH DISTRIBUTED POWER SOURCES AND METHOD THEREFOR

RELATED PATENTS

The present invention is related to "Celestial Tracking Apparatus And Method Of Controlling Wind Stow Therefor," by Herbert T. Hayden et al., filed Nov. 2, 2001, Ser. No. 09/970,186, and to "High-Concentration Photovoltaic Assembly For A Utility-Scale Power Generation System," by Jefferson G. Shingleton, et al., filed Jun. 27, 2001, Ser. No. 09/894,245.

TECHNICAL FIELD OF THE INVENTION

The present invention relates generally to the field of fail-safe electrical controls. More specifically, the present invention relates to remotely monitoring an environmental condition at different locations and indicating the status of the environmental condition at different locations.

BACKGROUND OF THE INVENTION

Fail-safe controls are designed to remain operational even though the controls may suffer certain types of failures. Such controls are typically used where severe consequences could result if a failure were to happen. The severe consequences are often in the form of a possibility or even a likelihood of harm to nearby humans or livestock, damage to expensive equipment or other capital assets, expensive legal liability, and the like.

Fail-safe controls typically achieve their fail-safe operation by including redundant components at vulnerable points. However, fail-safe controls often suffer deceptive vulnerabilities due to complexities involved with voting between redundant components when the redundant components provide opposing indications, with providing sensing signals and power that do not suffer from vulnerabilities, and with addressing the possibility of multiple failures from a single cause. Fail-safe controls tend to be undesirably expensive when compared to non-fail-safe counterparts due to the extra component and design complexities, and designers are often encouraged to mitigate the expense at the risk of introducing vulnerabilities, many of which may be difficult to appreciate prior to the occurrence of an actual event that leads to one or more actual failures.

One characteristic of fail-safe controls which leads to unwanted complexity is that the controls simultaneously address four different scenarios. For a true-OK scenario, the control system accurately indicates that a condition being monitored is in a state that permits continued operation of the system being controlled. In a true-Not-OK (NOK) scenario, the control system accurately indicates that the monitored condition is in a state where operations of the system being controlled should be curtailed. If no component failures occur, a properly designed control system operates only within these two scenarios, and if the control system need not be fail-safe, then no additional scenarios need be accommodated by the control system design.

However, for fail-safe operation, failures which lead to inaccurate indications should be considered. In a false-OK scenario, the control system inaccurately indicates that the monitored condition permits continued operation. In other words, the control system indicates that the system can continue operation when in fact the system should curtail operations. In a false-NOK scenario, the control system inaccurately indicates that the monitored condition signifies curtailed operation. In other words, the control system indicates that the system should curtail operations when in fact no reason exists for curtailed operation. For systems which employ fail-safe controls, the false-OK scenario is often deemed intolerable, while the false-NOK scenario is deemed to be unwanted but tolerable.

Fail-safe systems use sensors to monitor conditions which signify continued operation or curtailment. Often, the sensors are distributed to a number of diverse locations. Too often, prior art controls rely upon a common controller or other device to provide a common power source which drives a current loop passing through all sensors and/or monitors sensor outputs. If the current loop opens, due to the operation of any single sensor in the common loop, then the common controller detects the event and provides one or more signals leading to an indication of the event.

The use of a common controller is undesirable for fail-safe operation. A vulnerability is often introduced by concentrating functionality at a common point, such as a common controller. If the output indication function is routed through a common point, then failure of the common point can often lead to the intolerable false-OK scenario.

In conventional applications, a common power source is used for all sensors in a current loop. In some applications, the common power source introduces an intolerable false-OK vulnerability. In other applications, the common power source merely introduces a false-NOK vulnerability with respect to the absence of power due to an unwanted power-loss, but couples all sensors together in a manner that introduces an intolerable false-OK vulnerability to ground voltage rises or transient spikes and other typical power anomalies. The false-OK scenario may occur due to a reduced effectiveness of sensor redundancy by making multiple sensors susceptible to simultaneous failures from a single cause.

Fail-safe controls are beneficial in a diverse range of applications. One application to which one preferred embodiment of the present invention is directed concerns the control of very large, concentrating solar collectors that track the movement of the sun. The above-listed related patents discuss examples of such solar collectors which may have a very large surface area, e.g., 1500–2500 ft$^2$, mounted on a common tower. When wind hits this very large surface area, tremendous destructive forces are transmitted to the tower. Significant cost savings may be realized by using a moderately strong tower that will withstand all but the gale-force wind conditions that occur only rarely. In the rare occurrence of a gale-force wind, the solar collectors are desirably placed in a wind stow attitude, where the collectors present a relatively small surface area to the wind and therefore transmit greatly reduced forces to the mounting tower. In this application, fail-safe operation is desirable because failure to go into the wind stow attitude in high wind conditions risks expensive equipment damage at the least, and quite possibly to jeopardizing human health and safety and to expensive legal liabilities.

SUMMARY OF THE INVENTION

It is an advantage of the present invention that an improved sensor loop with distributed power sources and method therefor are provided.

Another advantage of the present invention is that a modular sensor unit is provided for easy incorporation in a variety of designs to reduce design complexity without unduly risking the introduction of subtle false-OK vulnerabilities.

Another advantage of the present invention is that a sensor loop and method are configured for ease of maintenance.

Another advantage of the present invention is that power-supplying, condition-sensing, and condition-indicating functions are all distributed to reduce single-point, false-OK vulnerabilities.

Another advantage is that a sensor loop and method control the placement of solar collectors into a wind stow attitude in the event of a high wind condition.

These and other advantages are realized in one form by an improved sensor loop which distributes indications of a condition monitored at different locations. The sensor loop comprises a plurality of sensor units coupled in series to form a closed circuit. Each sensor unit includes a local power source, a local sensor switch, and a local load. The local load, local sensor switch, and local power source are coupled in series within each sensor unit.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
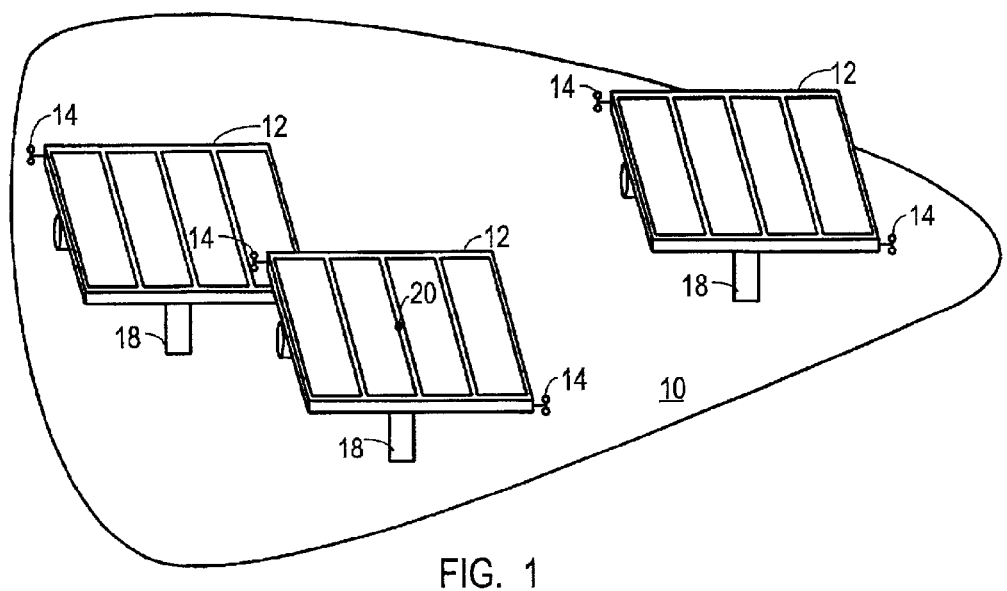
FIG. 1 shows a farm of very large solar collectors in a normal operational attitude in accordance with the teaching of one embodiment of the present invention.

FIG. 1 shows a farm 10 of very large solar collectors 12 in a normal operational attitude in accordance with the teaching of one embodiment of the present invention. For the normal operational attitude (FIG. 1), solar collectors 12 desirably face the sun to maximize energy production, and track the sun as the sun moves across the sky. Some of solar collectors 12 may be located so close to others that if they were to fall they could hit the other solar collectors 12. Other solar collectors 12 may be located some distance from any other solar collector 12 so that wind conditions may vary somewhat between the different locations. FIG. 1 depicts only three solar collectors 12, but any number of solar collectors 12 may be provided.

Each solar collector 12 desirably has one or more nearby sensors 14. In general, sensors 14 sense or monitor an environmental phenomenon or condition that is used by a fail-safe sensor loop (discussed below) to indicate when operation of a system is acceptable or should be curtailed. In this solar collector embodiment of the present application, the system is represented by farm 10, the normal solar-tracking attitude depicted in FIG. 1 indicates acceptable system operation, and the wind stow attitude depicted in FIG. 2 indicates curtailed operation. In this embodiment, each sensor 14 is an anemometer, and wind 16 represents the sensed environmental phenomenon. Desirably, when the speed of wind 16 exceeds a predetermined threshold, solar collectors 12 move to their wind stow positions (FIG. 2) to present a smaller surface area to the wind and lessen destructive forces on mounting towers 18 of solar collectors 12.

Figure 2:
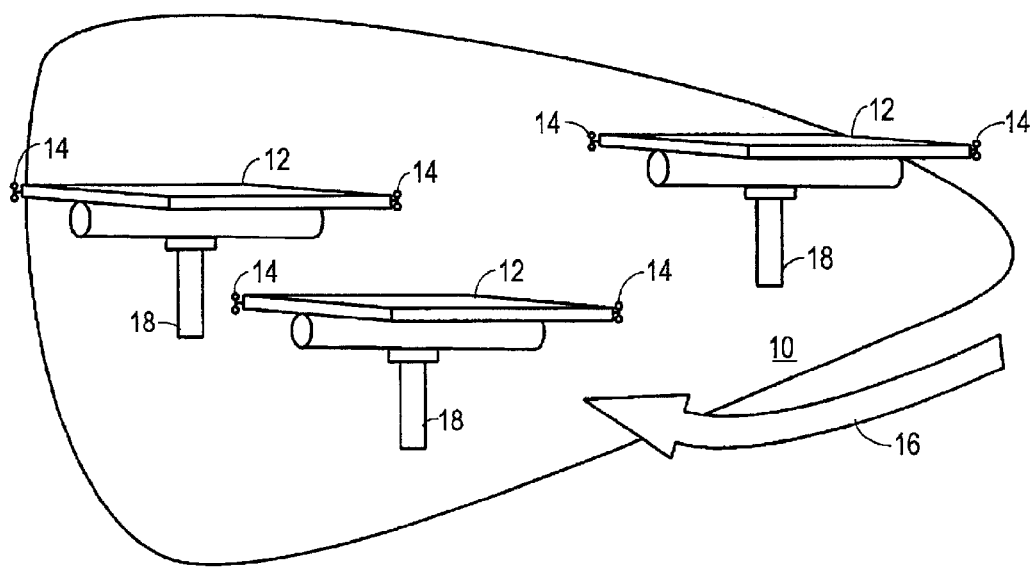
FIG. 2 shows the farm of very large solar collectors in a wind stow attitude.

Desirably, the sensor loop (discussed below) is a fail-safe control system. As a fail-safe control system, it is designed to remain operational even though the controls may suffer certain types of failures. While an absence of any failure in the sensor loop is the most desirable scenario, a false-OK failure is deemed intolerable, and a false-Not OK (NOK) failure is deemed unwanted but tolerable. The sensor loop is desirably configured to remain sufficiently operational in the event of certain types of failures so that false-OK indications are extremely unlikely. A false-OK failure would be the result if excessive wind occurred, but solar collectors 12 failed to move to their wind stow positions (FIG. 2). In the false-OK scenario, extensive property damage, serious health and safety danger, and legal liability would be the possible or perhaps likely results. A false-NOK failure would be the result if solar collectors 12 moved to their wind stow positions in the absence of excessive wind. In the false-NOK scenario, an opportunity to produce electricity would be lost and the source of the false-NOK failure would need to be investigated. The consequences of a false-OK scenario are much more onerous than the false-NOK scenario.

In one preferred embodiment, each member of a pair of sensors 14 is mounted proximate a target position 20, such as the center of a solar collector 12. Thus, FIG. 1 depicts two anemometers 14 mounted to the outer periphery of solar collectors 12 where they are free to measure wind speed and do not cast a shadow on solar collector 12. A number of sensors 14 have been distributed throughout farm 10. By positioning sensors 14 in pairs located physically proximate to one another, particularly good redundancy is provided with respect to sensing the monitored environmental phenomenon, e.g. wind speed. However, since sensors 14 are distributed throughout farm 10, redundancy is nevertheless provided by still other sensors 14 associated with other solar collectors 12 in farm 10, and the inclusion of sensors 14 in pairs is not required.

While FIGS. 1 and 2 depict only a solar collector preferred embodiment, those skilled in the art will appreciate that a wide variety of applications may benefit from the fail-safe sensor loop (discussed below) of the present invention. For example, sensors 14 may alternatively monitor a wide variety of conditions and respond with a wide variety of indications to the occurrence or absence of the monitored conditions. A non-exclusive list of possible internal and external environmental phenomenon that may be monitored includes volatile, toxic, or otherwise unwanted gasses, hazardous biological or chemical agents, dangerously high or low pressure levels, voltage, current or frequency levels, fuel, water or sewage spills or leaks, positions of mechanical devices, the presence or absence of objects, and the like. A non-exclusive list of possible indications that may be made in response to detecting a monitored condition includes sounding an alarm, flashing a light, opening or closing a switch or valve, energizing or de-energizing a machine, moving a mechanical device to a safer position, reporting the occurrence or absence of the monitored condition to a computer, automatically dialing a telephone number, and the like.

Figure 3:
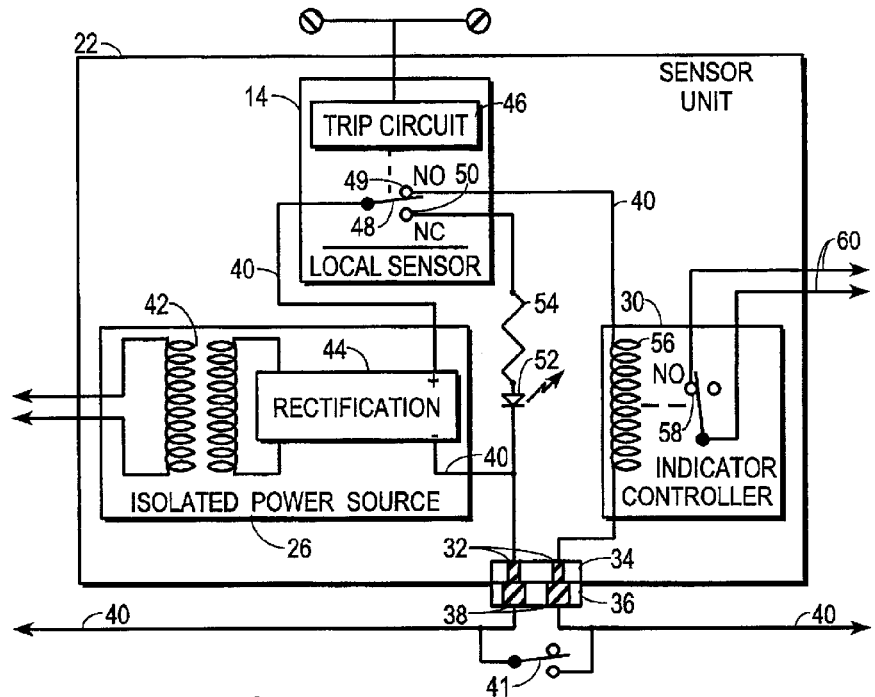
FIG. 3 shows a block diagram of a sensor unit which serves as a modular component used at a plurality of locations in a sensor loop in accordance with the teaching of the present invention.
Figure 4:
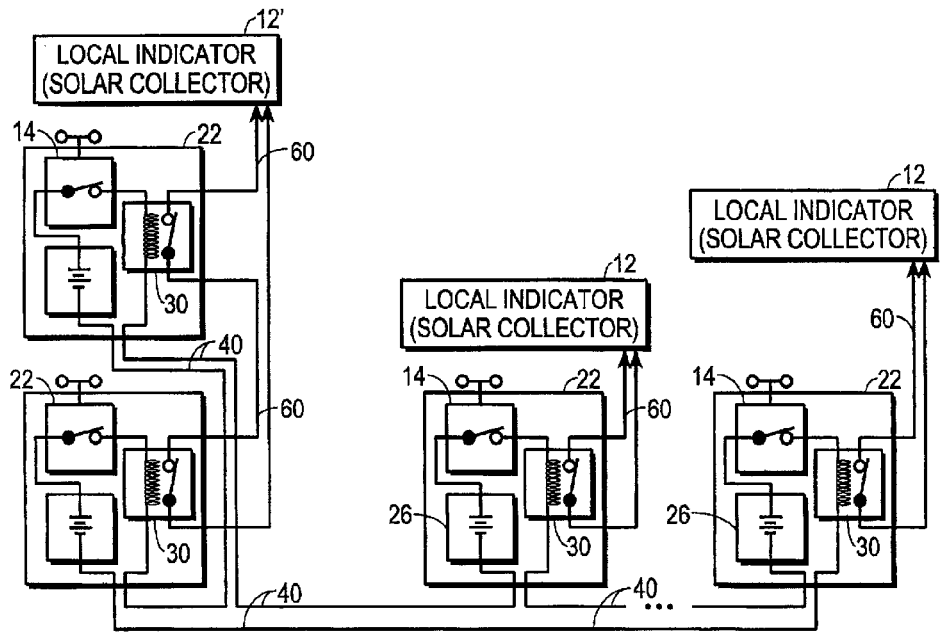
FIG. 4 shows a block diagram of the sensor loop.

FIG. 3 shows a block diagram of a sensor unit 22 which serves as a modular component that is used at a plurality of locations in the sensor loop in accordance with the teaching of the present invention. FIG. 4 shows a block diagram of a sensor loop 24 that uses sensor units 22 and may provide fail-safe control of solar collectors 12 (FIGS. 1–2) or other systems.

Referring to FIGS. 3 and 4, each sensor unit 22 is desirably configured similar to the others in sensor loop 24 to promote modularity and ease of system design, but this is not a requirement of the present invention. Each sensor unit 22 includes a local power source 26, a local sensor 14 and a local indicator controller 30. Local power source 26, local sensor 14, and local indicator controller 30 are coupled in series within sensor unit 22, and coupled between two sensor contacts 32 of a sensor connector 34 for sensor unit 22.

Each sensor connector 34 mates with a loop connector 36 having two loop contacts 38. A closed circuit 40 forms by connecting sensor units 22 in series through sensor and loop connectors 34 and 36. Closed circuit 40 includes all sensor units 22 in sensor loop 24 and all wiring used to couple sensor units 22 together. Desirably, closed circuit 40 includes no other substantial influence over the electrical current flowing therein. No centralized controller is needed.

Primarily for troubleshooting purposes, a switch 41 is included in association with each sensor unit 22, but located outside of each associated sensor unit 22. Each switch 41 is coupled across loop contacts 38. For normal operation, switch 41 is maintained in an open configuration. However, for troubleshooting purposes switch 41 may be switched to a closed configuration to remove the associated sensor unit 22 from sensor loop 24 without otherwise influencing sensor loop 24. Through switch 41, a sensor unit 22 may be physically removed from closed circuit 40 without interrupting current flow therein. In the preferred embodiment, switch 41 is a manually operated switch.

Local power source 26 is desirably configured as an isolated power source. In other words, power source 26 maintains a relatively high degree of electrical isolation between a closed circuit 40 and the earth. In one embodiment, isolated power source 26 includes a transformer 42 coupled to a rectification circuit 44. The primary side of transformer 42 may plug into the public AC power distribution network and need not be earth-isolated. The secondary side of transformer 42 remains earth-isolated, and couples to rectification circuit 44. Rectification circuit 44 serves as in-series power source 26 for closed circuit 40.

The isolation provided by transformer 42 prevents unintended currents from flowing through the components of closed circuit 40 in response to groundvoltage disturbances and other power anomalies that may plague the public AC power distribution network or the solar system itself. For example, lightning strikes may be a source of such voltage disturbances in the solar system itself. The use of the public AC power distribution network to energize power sources 26 poses no false-OK vulnerability and provides an inexpensive way to provide power in a distributed and isolated manner to a number of sensor units 22. Should a power outage occur, current could cease flowing in closed circuit 40, and an unwanted but tolerable false-NOK failure may result.

While FIG. 3 depicts power source 26 as being located within the boundaries of sensor unit 22, those skilled in the art will appreciate that sensor unit 22 may be configured so that an inexpensive external transformer or power unit, e.g., "wall wart," may be used for power source 26 so long as earth isolation is maintained. Batteries and/or solar panels may be used to provide isolated power source 26 in other embodiments. Likewise, while the preferred embodiment uses a constant-voltage power source, those skilled in the art will readily recognize that a constant-current power source may also be used.

In the solar collector embodiment, local sensor 14 is provided by or otherwise couples to a conventional anemometer, but other applications can use other sensors that are configured to monitor environmental phenomena other than wind speed. Typically, local sensor 14 will include a trip circuit 46 which determines when a threshold condition is reached. Trip circuit 46 couples to and controls a local sensor switch 48.

Local sensor switch 48 desirably includes a normally open (NO) contact 49 through which closed circuit 40 passes. Normally open contact 49 remains closed so long as the monitored condition is absent, but opens when the monitored condition is detected. When normally closed contact 49 opens, electrical current is prevented from flowing in closed circuit 40 and sensor loop 24 generally. Since any number of sensor units 22 having local sensor switches 48 therein are connected in series throughout sensor loop 24, when any one of local sensors 28 detects the monitored condition, current stops flowing at all sensor units 22.

Those skilled in the art will appreciate that normally open switches and contacts need not normally operate in their open configuration, and that normally closed switches and contacts need not normally operate in their closed configuration. Rather, normally closed refers to a switch or contacts that are closed when a switch or relay is not energized, and normally open refers to a switch or contacts that are open when a switch or relay is not energized. Removal of energization, whether by failure or otherwise, will cause the contacts to go to their normal configuration.

In one embodiment, sensor unit 22 includes a trip indicator 50 isolated from closed circuit 40. Trip indicator 50 indicates whether local sensor switch 48 is in an open or closed configuration as an aid to troubleshooting. When current is not flowing in closed circuit 40 for an unknown reason that may have resulted in a false-NOK failure, trip indicator 50 for each sensor unit 22 indicates whether that specific sensor unit 22 has tripped. FIG. 3 depicts trip indicator 50 as being provided by a normally closed contact 50 for local sensor switch 48, in combination with a light emitting diode 52 and a resistor 54 coupled in series between normally open contact 50 and a negative terminal of power source 26. However, other trip indicators may also be devised.

Indicator controller 30 includes a local load 56 and a normally open (NO) local load switch 58 that is controlled by local load 56. Indicator controller 30 may be provided by a conventional relay, whether of an electromechanical, semiconductor, or solid state design.

Local load 56 exhibits a local load impedance and power source 26 supplies a local voltage. Indicator controller 30 is configured so that normally open local load switch 58 is open if substantially no current flows in closed circuit 40, and normally open local load switch 58 is closed when a current substantially equal to the local voltage divided by the local load impedance flows in closed circuit 40. If local load 56 has a nominal voltage rating, then power source 26 is configured to provide substantially that voltage. If local load 56 has a nominal current rating, then power source 26 is configured to provide substantially that current. Thus, in each sensor unit 22, power source 26 maintains only so much voltage as will develop across local load 56 when the rated or nominal current for indicator controller 30 flows through local load 56.

All sensor units 22 operate in a similar manner. Thus, the supply of power is distributed in series throughout sensor loop 24. A total impedance for closed circuit 40 roughly equals the sum of all local load impedances of local loads 56, with the impedances of power sources 26, local sensors 14, and interconnecting wiring providing only an insubstantial influence on the total impedance. A total voltage supplied in closed circuit 40 equals the sum of all local voltages supplied by local power sources 26. The current flowing in closed circuit 40 substantially equals the total voltage divided by the total impedance, but the total voltage and total impedance are distributed throughout sensor loop 24.

Local load switch 58 provides an indicator output 60 for each sensor unit 22. Indicator outputs 60 from the sensor units 22 included in sensor loop 24 couple to local indicators 12. As discussed above, in the preferred embodiment, the local indicators 12 are solar collectors that move to their wind stow attitudes (FIG. 2) when excess wind 16 is detected. Sensor units 22 are desirably distributed over farm 10. The excess wind condition may occur at any one of sensor units 22, and need not occur at more than one of sensor units 22. At that one sensor unit 22, local sensor switch 48 will open, causing current flow in closed circuit 40 to cease and all local load switches 58 in all sensor units 22 to open. As a result, all solar collectors 12 indicate the occurrence of the monitored condition by moving into their wind stow attitudes.

One potential false-OK vulnerability might possibly be introduced by having only a few sensor units in sensor loop 24. If a local sensor 14 fails so that its local sensor switch 48 does not open when the monitored condition occurs, then a false-OK failure is possible. However, this vulnerability is adequately addressed by including many sensor units 22 in sensor loop 24. Any one sensor unit 22 may experience such a failure, but a very high probability exists that other sensor units 22 monitoring the same environmental condition will detect the condition, particularly if they are located physically near the potentially failing sensor unit. In one embodiment, redundancy is provided not by electronics, but by physical location when each sensor unit 22 member of a pair of sensor units 22 is located near a target point 20. Both members of the pair sense substantially the same set of inputs, and no electronics must be dedicated to voting between redundant circuits.

Another potential false-OK vulnerability might possibly be introduced through the operation of local indicator controllers 30. If a local indicator controller 30 were to fail to enter its normally open configuration when no current flows in closed circuit 40, then the local indicator 12 coupled to that indicator controller 30 would fail to indicate the occurrence of the monitored condition. This potential vulnerability is mitigated by the fact that only one item, e.g., a single solar collector 12 within farm 10, in the system fails to enter its safe mode, thereby lessening consequences of the failure. Further mitigation is provided by using conventional electromechanical relays for indicator controller 30. In a conventional relay, as contrasted to a solid state or semiconductor relay, local load 56 is provided by a relay coil, and a mechanical spring is used to break electrical contact when current ceases to flow in the relay coil. The potential failure of concern is particularly unlikely with a conventional relay.

Still further mitigation may be provided by coupling local load switches 58 in series to drive a local indicator 12, as depicted in FIG. 4 in connection with a local indicator 12'. Thus, sensor units 22 may be configured in pairs, with the local load switches 58 in the two members of a sensor unit pair being coupled in series. In the highly unlikely event that one of the in-series local load switches 58 were to fail in the closed configuration in spite of no current flowing in its local load 56, then the other one of the in-series local load switches 58 would be available to provide redundancy with respect to indicating the occurrence of the monitored condition.

In summary, an improved sensor loop 24 with distributed power sources 26 and method therefor are provided. A modular sensor unit 22 is provided for easy incorporation in a variety of designs. The modular and inexpensive nature of sensor unit 22 allows any number of sensor units 22 to be included in a loop, with more sensor units 22 providing increased redundancy with respect to monitoring an environmental condition. Due to the distribution and isolation of power sources 26, false-OK vulnerabilities from common power sources and multiple single-cause failures are greatly reduced. Likewise, false-OK vulnerabilities are reduced by distributing the indication function between sensor units 22, with still greater false-OK vulnerability reduction achievable simply by component selection and the coupling of sensor units 22 together in pairs. Ease of maintenance of the sensor loop is supported through the inclusion of distributed power sources 26, trip indicators 50, and switches 41. Distributed power sources 26 eliminate the requirement for termination resistors that have needed changing in prior art control systems at a central controller when alterations are made in the field. Sensor units 22 may be freely added or removed in sensor loop 24 without requiring adjustments to be made at any other location in sensor loop 24.

Although the preferred embodiments of the invention have been illustrated and described in detail, it will be readily apparent to those skilled in the art that various modifications may be made therein without departing from the spirit of the invention or from the scope of the appended claims. For example, even though no central controller is required in connection with the present invention, nothing prevents one from being added to the sensor loop described herein. Moreover, nothing prevents additional devices from being coupled into sensor loop 24. Such additional devices may include a central controller, sensor units without power sources, and/or the like.

What is claimed is:

1. A sensor loop for distributing indications of a condition monitored at different locations, said sensor loop comprising:
    a plurality of sensor units coupled in series to form a closed circuit, wherein each sensor unit comprises:
    a local power source;
    a local sensor switch; and
    a local load, said local load, said local sensor switch and said local power source being coupled in series within said sensor unit.

2. A sensor loop as claimed in claim 1 wherein said local sensor switch is a normally open switch operated to open when said condition is detected.

3. A sensor loop as claimed in claim 1 wherein said local sensor switch is provided by an anemometer.

4. A sensor loop as claimed in claim 1 wherein:
    said local loads couple to a solar collector; and
    said solar collector is configured to move to a wind stow position when one of said local sensor switches opens.

5. A sensor loop as claimed in claim 1 additionally comprising a local indicator coupled to said local load.

6. A sensor loop as claimed in claim 5 wherein said local indicator couples to said local load through a normally open local load switch.

7. A sensor loop as claimed in claim 6 wherein said local indicator indicates an occurrence of said condition when said local load switch is in an open configuration and indicates an absence of said condition when said local load switch is in a closed configuration.

8. A sensor loop as claimed in claim 5 wherein, for each sensor unit:

said local power source supplies a local voltage;

said local load exhibits a local load impedance;

said local indicator is configured to indicate an absence of said condition when a current substantially equal to said local voltage divided by said local load impedance passes through said local load; and said local indicator is configured to indicate an occurrence of said condition when substantially no current passes through said local load.

9. A sensor loop as claimed in claim 8 wherein:

said condition is represented by wind speed exceeding a predetermined threshold;

said local sensor is an anemometer; and said local indicator is a solar collector that is placed in a wind stow position when said wind speed exceeds said predetermined threshold.

10. A sensor loop as claimed in claim 1 wherein:

each local power source supplies a local voltage, and a total voltage equals the sum of all of said local voltages;

each local load exhibits a local load impedance, and a total impedance equals the sum of all of said local load impedances; and current flowing in said closed circuit substantially equals said total voltage divided by said total impedance.

11. A sensor loop as claimed in claim 1 wherein said local power source provides an output that is isolated from the earth.

12. A sensor loop as claimed in claim 1 wherein at least a portion of said local loads are relay coils.

13. A sensor loop as claimed in claim 1 wherein each of said sensor units additionally comprises a sensor connector having at least first and second sensor-connector contacts configured so that said local power source, said local sensor switch, and said local load thereof are coupled between said first and second sensor-connector contacts of said sensor connector, and wherein said sensor loop additionally comprises:

a plurality of loop connectors wherein each loop connector has first and second loop-connector contacts and is configured to mate with said one of said sensor connectors; and a plurality of switches, wherein each of said switches couples across said first and second loop-connector contacts of said loop connectors.

14. A sensor loop as claimed in claim 1 wherein:

at least one of said local sensor switches is provided by a local sensor; and said local sensor includes a trip indicator isolated from said closed circuit, said trip indicator being configured to indicate whether said local sensor switch of said local sensor is in an open or closed condition.

15. A sensor loop as claimed in claim 1 wherein:

said local sensor switches of said sensor units are provided by local sensors that monitor an environmental phenomenon;

each member of a pair of said sensor units is positioned proximate a target position to provide redundancy with respect to sensing said environmental phenomenon at said target position;

each of said local loads in said pair of sensor units is associated with a normally open local load switch; and said sensor loop additionally comprises a local indicator, said local indicator being coupled in series with said local load switches of said pair of sensor units so that said local load switches provide redundancy with respect to indicating said condition.

16. A method of distributing indications of a condition monitored at different locations, said method comprising:

positioning sensor units at said different locations;

configuring each sensor unit to include a local power source, a local sensor switch, and a local load electrically coupled in series, and a normally open local load switch coupled to said local load;

electrically coupling said sensor units in series to form a closed circuit; and providing local indicators coupled to said local load switches and configured to indicate occurrences of said condition when said local load switches are open.

17. A method as claimed in claim 16 additionally comprising:

allowing an electrical current to flow in said closed circuit when all of said local sensor switches are closed;

closing said normally open local load switches when said electrical current flows in said closed circuit;

preventing electrical current from flowing in said closed circuit when any of said local sensor switches is open; and opening all of said normally open local load switches when said electrical current is prevented from flowing in said closed circuit.

18. A method as claimed in claim 16 wherein:

said local indicators are solar collectors;

said local sensor switches of said sensor units are provided by anemometers; and said providing activity comprises moving said solar collectors to wind stow positions when wind speed exceeds a predetermined threshold.

19. A method as claimed in claim 16 additionally comprising electrically isolating said local power sources from the earth and from each other.

20. A sensor loop for distributing indications of an excessive wind condition monitored at different locations, said indications being effected by moving solar collectors to wind stow positions, said sensor loop comprising:

a plurality of sensor units coupled in series to form a closed circuit, wherein each sensor unit comprises:

a local power source which supplies a local voltage;

a local anemometer having a local sensor switch which opens when said excessive wind condition is detected;

a local load exhibiting a local load impedance, said local load, said local sensor switch and said local power source being coupled in series within said sensor unit; and a normally open local load switch coupled to said local load and to one of said solar collectors, wherein said solar collectors are configured to move to said wind stow positions when substantially no current flows through said closed circuit and are allowed to refrain from moving to said wind stow positions when a current substantially equal to said local voltage divided by said local load impedance passes through said local loads.

21. A sensor loop as claimed in claim 20 wherein said local power sources provide outputs that are isolated from the earth and from each other.

* * * * *